US005923889A

United States Patent [19]

Kim et al.

[11] Patent Number: 5,923,889

[45] Date of Patent: Jul. 13, 1999

[54] TECHNIQUE FOR SETTING POWER SAVING MODE ACCESS TIME IN IMAGE FORMING APPARATUS

[75] Inventors: Myung-Que Kim, Ahnyang; Seong Kim, Suwon, both of Rep. of Korea

[73] Assignee: SamSung Electronics Co., Ltd., Suwon, Rep. of Korea

[21] Appl. No.: 08/910,050

[22] Filed: Aug. 12, 1997

[30] Foreign Application Priority Data

Aug. 12, 1996 [KR] Rep. of Korea ...................... 96-33449

[51] Int. Cl.[6] ........................................ G06F 1/32

[52] U.S. Cl. ................................ 395/750.05; 395/750.01; 395/750.03

[58] Field of Search ......................... 395/750.01, 750.02, 395/750.03, 750.04, 750.05; 364/707

[56] References Cited

U.S. PATENT DOCUMENTS

| | | | |
|---|---|---|---|
| 4,745,436 | 5/1988 | Matsuura . | |
| 5,241,349 | 8/1993 | Nagasaka . | |
| 5,321,478 | 6/1994 | Nakamura et al. . | |
| 5,410,711 | 4/1995 | Steward | 395/750.04 |
| 5,452,277 | 9/1995 | Bajorek et al. . | |
| 5,489,935 | 2/1996 | Dornier . | |
| 5,493,670 | 2/1996 | Douglis et al. . | |
| 5,542,035 | 7/1996 | Kikinis et al. . | |
| 5,566,340 | 10/1996 | Stewart et al. . | |
| 5,589,923 | 12/1996 | Lee et al. . | |
| 5,617,572 | 4/1997 | Pearce et al. . | |
| 5,721,936 | 2/1998 | Kikinis et al. | 395/750.05 |
| 5,809,316 | 9/1998 | Gouzu | 395/750.05 |

FOREIGN PATENT DOCUMENTS

| | | |
|---|---|---|
| 0 458 572 | 11/1991 | European Pat. Off. . |
| 0 682 295 | 11/1995 | European Pat. Off. . |
| 406339060 | 11/1994 | Japan . |
| 408146840 | 6/1996 | Japan . |

OTHER PUBLICATIONS

Patent abstracts of Japan, to Hiraike Shizuka, entitled Copying Machine with Timer, publication date Feb. 27, 1981, one page.

Patent abstracts of Japan, to Kaneko Masaru, entitled Image Forming Device, publication date Aug. 9, 1996, one page.

*Primary Examiner*—Glenn A. Auve
*Assistant Examiner*—Xuan M. Thai
*Attorney, Agent, or Firm*—Robert E. Bushnell, Esq.

[57] ABSTRACT

A technique for setting a power saving access time of an image forming apparatus includes: checking the time that no image is formed, and producing a value corresponding to the checked time; calculating a power saving mode access time according to data corresponding to the checked time; and resetting a power saving mode access time to the calculated power saving mode access time.

8 Claims, 2 Drawing Sheets

TECHNIQUE FOR SETTING POWER SAVING MODE ACCESS TIME IN IMAGE FORMING APPARATUS

This application makes reference to, incorporates the same herein, and claims all benefits accruing under 35 U.S.C. §119 from an application for METHOD FOR SETTING POWER SAVING MODE ACCESS TIME IN IMAGE FORMING APPARATUS earlier filed in the Korean Industrial Property Office on Aug. 12, 1996 and there duly assigned Ser. No. 33449/1996.

BACKGROUND OF THE INVENTION

1. Field of the Invention

The present invention relates to a power saving mode in an image forming apparatus, more particularly, to a technique for setting a power saving mode access time in an image forming apparatus.

2. Description of the Related Art

Generally, an image forming apparatus having a power saving mode, effects the power saving mode by cutting off unnecessary power when a user does not use the apparatus. The image forming apparatus automatically effects the power saving mode when a specific time has passed without an image being formed in the image forming apparatus. The specific time is referred to as a power saving mode access time.

The power saving mode access time is generally set by estimating a user's own image forming tendency and by using an operating panel of the image forming apparatus. Alternatively, a printer control plate of a host computer is used for setting the power saving mode access time. However, the image forming tendency may be changed for the user's business or for other reasons. At this time, the user may reset the power saving mode access time. However, when the image forming tendency is slightly changed, the user may not recognize it himself. Moreover, it is cumbersome for the user to reset the power saving mode access time whenever the image forming tendency is changed, even when the user recognizes it. Accordingly, the user uses an earlier power saving mode access time as is. However, there are problems in using the earlier power saving mode access time. For example, the problems are as follows.

In an earlier technique, a predetermined power saving mode access time is set to five minutes when an image is formed once an hour. This is to reduce electrical power consumption by promptly accessing the power saving mode since the image is formed every hour. However, when the image is formed every ten minutes due to a change of the image forming tendency, the user has to wait for a wake-up time of the image forming apparatus whenever printing is performed since the image forming apparatus accesses the power saving mode every five minutes. The wake-up time is for converting the power saving mode to a status for enabling the image forming apparatus to perform the image forming operation.

In another earlier technique, the power saving mode access time is set to thirty minutes when an image is formed every twenty minutes without waiting the wake-up time. However, when the image is formed every two hours due to a change of the image forming tendency, the image forming apparatus is unnecessarily in a wake-up status, causing an increased power consumption.

The earlier techniques for setting the power saving mode access time in the image forming apparatus as mentioned above, have problems, in which they fail to cope with a change of the user's printing tendency appropriately to the extent that the user does not reset the power saving mode access time by himself, causing an increased energy consumption or causing the user to wait for a wake-up time of the image forming apparatus whenever printing is performed. Also, such problems occur in the case of changing the user operating the image forming apparatus.

The patent to Nakamura et al., U.S. Pat. No. 5,321,478 entitled Image forming Apparatus Which Can Discriminate Frequency Of Image Forming Operations, discloses a system which sets the predetermined time period of the electric power reduction unit variably in accordance with the frequency of image forming operations discriminated by the discriminating unit.

The patent to Pearce et al., U.S. Pat. No. 5,617,572 entitled System For Reducing Power Consumption In Computers, discloses a system which adjusts the frequency with which timer interrupts are generated after the expiration of each time period.

The patent to Stewart et al., U.S. Pat. No. 5,566,340, entitled Portable Computer System With Adaptive Power Control Parameters, discloses a system in which the inactivity period required for entering a stand-by mode is varied in accordance with the user demands.

The Kikinis et al. patent, the Bajorek et al. patent, and the Douglis et al., patent, U.S. Pat. Nos. 5,542,035, 5,452,277, and 5,493,670, respectively entitled, Timer-Controlled Computer System Shutdown And Startup, Adaptive System For Optimizing Disk Drive Power Consumption, and Adaptive Disk SPN-Down Method For Managing The Power Distributed To A Disk Drive In A Laptop Computer, also disclose systems in which the stand-by state time period is varied in accordance with the user's requirements.

The following additional patents each disclose features in common with the present invention but are not as pertinent as the patents discussed in detailed above: the Nagasaka patent, U.S. Pat. No. 5,241,349 entitled Image Forming Apparatus Having A Plurality Of Control Modes Of Thermal Fixing Apparatus, the Dornier patent, U.S. Pat. No. 5,489,935 entitled Laser Printer Power Saver, and the Lee et al. patent, U.S. Pat. No. 5,589,923 entitled Power Saving Method of An Image Forming Apparatus.

While each of the aforecited patents has features in common with the present invention, none of them teaches the specifically recited technique for setting the power saving mode access time in accordance with the specifically recited equations of the present invention.

SUMMARY OF THE INVENTION

Therefore, it is an object of the present invention to provide a technique for automatically setting a power saving mode access time adapted to a change of a user or a user's printing tendency.

To accomplish this object according to the present invention, technique is provide for setting a power saving access time of an image forming apparatus, comprising: checking the time that no image is formed, and producing a value corresponding to the checked time; calculating a power saving mode access time according to data corresponding to the checked time; and resetting a power saving mode access time to the calculated power saving mode access time.

BRIEF DESCRIPTION OF THE DRAWINGS

These and various features and advantages of the present invention will be readily understood with reference to the following detailed description taken in conjunction with the accompanying drawings, wherein.

DETAILED DESCRIPTION OF THE PREFERRED EMBODIMENT

Hereinafter, a preferred embodiment of the present invention will be described in detail with reference to the accompanying drawing. Various detail items in the following explanation and accompanying drawings are provided for better understanding the present invention. However, it will be apparent to one skilled in the art that present invention can be practiced without these specific details. Also, a detailed description of known functions and constructions unnecessarily obscuring the subject matter of the present invention have been omitted in the present invention.

Since the present invention is used in an image forming apparatus having a power saving mode, it will be described with reference to a laser printer hereinafter.

Figure 1:
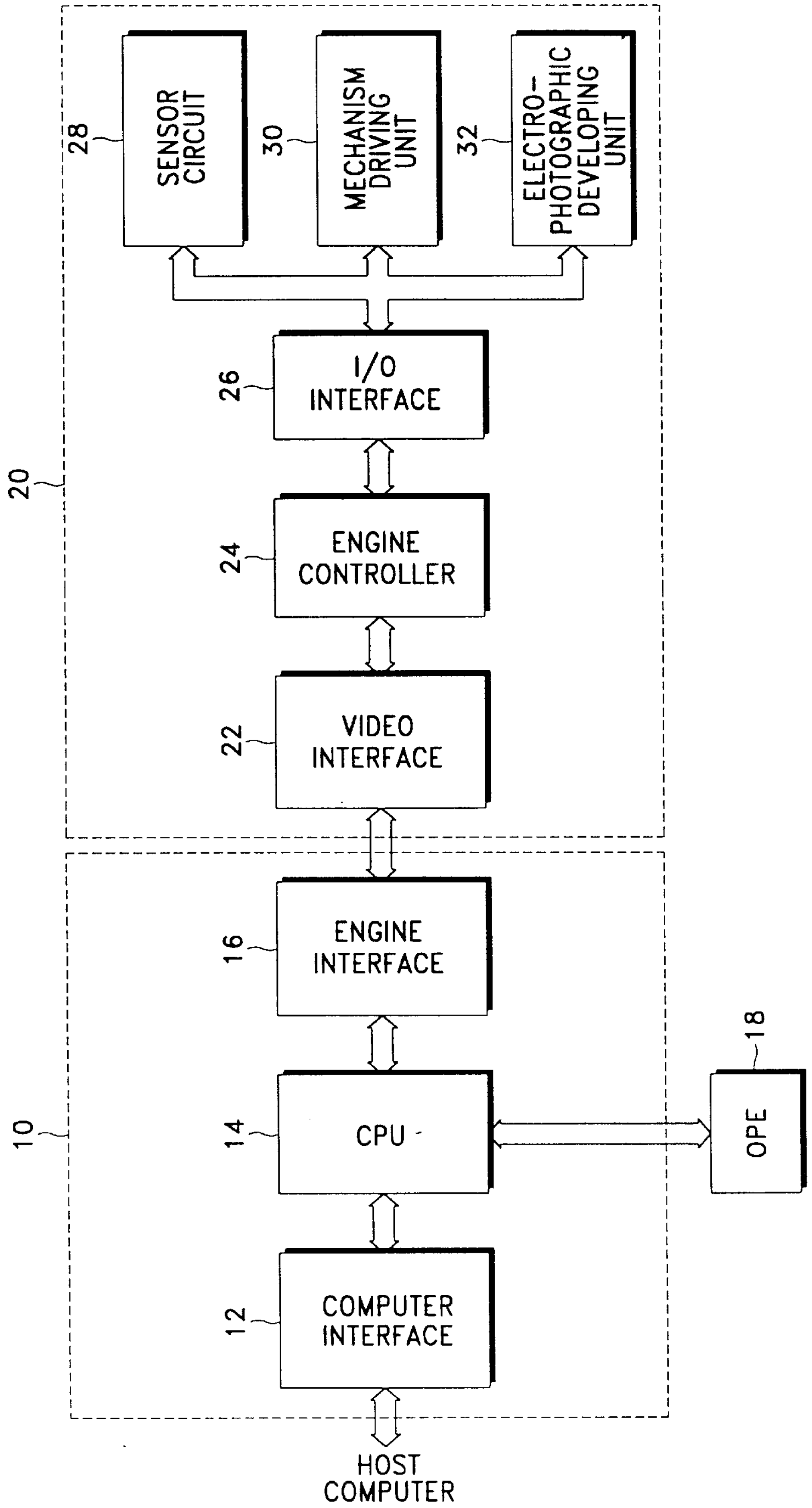
FIG. 1 is a block diagram illustrating a construction of a laser printer.

FIG. 1 is a block diagram illustrating a construction of a laser printer. The laser printer is generally composed of a video controller 10, a print engine unit 20 and an operating panel 18. The video controller 10 consists of a computer interface 12, a central processing unit (CPU) 14 and an engine interface 16. The computer interface 12 is connected between a host computer and the CPU 14, thereby interfacing input/output signals. The CPU 14 having a ROM with a control program and a font and having a RAM for temporarily storing all kinds of data inputted from the operating panel 18 and the host computer, converts printing data received from the computer interface 12 into image data, and transfers the image data to the print engine unit 20. In particular, the CPU 14 is comprised of a non-volatile memory for storing a power saving mode access time. The engine interface 16 interface input/output signals with the print engine unit 20 under the control of the CPU 14. The operating panel 18 is controlled by the CPU 14 and is comprised of a plurality of keys for inputting all kinds of commands according to the present invention and a display unit for displaying information according to the operation of the laser printer. The print engine unit 20 is comprised of a video interface 22, an engine controller 24, an input/output interface 26, a sensor circuit 28, a mechanism driving unit 30 and an electrophotographic developing unit 32, and is connected to the video controller 10. The video interface 22 provides an interface to transmitting/receiving signals between the video controller 10 and the engine unit 24. The engine controller 24 controls the mechanism driving unit 30 and the electrophotographic developing unit 32 under the control of the video controller 10, and prints an image according to the image data received from the video controller 10 on printing paper. Also, the engine controller 24 senses an operating state of each unit of the print engine unit 20 through the sensor circuit 28. For example, the operating state of each unit may be a state for supplying or transferring the printing paper. The input/output interface 26 is connected between the engine controller 24, the sensor circuit 28, the mechanism operating unit 30 and the electrophotographic developing unit 32, and interfaces input/output signals of the engine controller 24. The sensor circuit 28 drives all kinds of sensors for sensing the operating state of each unit, a state of supplying and transferring printing paper and the amount of a developer, and transfers sensing signals of the sensors to the engine controller 24. The mechanism driving unit 30 drives all kinds of mechanism for supplying and transferring the printing paper and printing under control of the engine controller 24. The electrophotographic developing unit 32 prints the image according to the image data on the printing paper under the control of the engine controller 24.

Figure 2:
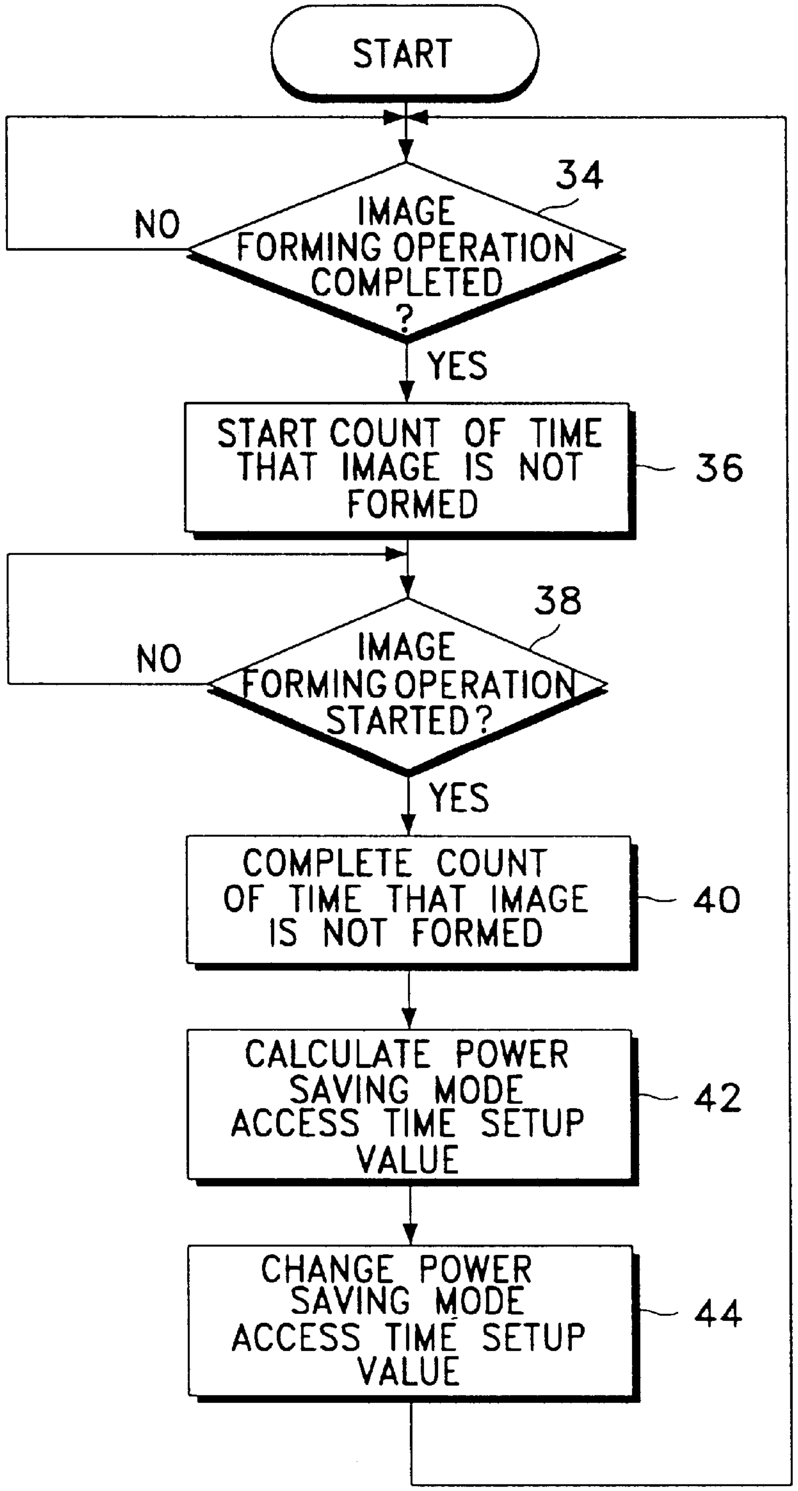
FIG. 2 is a flowchart illustrating a procedure for setting a power saving mode access time of an image forming apparatus according to a preferred embodiment of the present invention.

FIG. 2 is a flowchart illustrating a procedure of setting a power saving mode access time of an image forming apparatus according to a preferred embodiment of the present invention. The procedure shown in FIG. 2 is started when the laser printer has completed an image forming operation. In step 34, the CPU 14 checks whether or not the image forming operation has been completed. At this time, if so, step 36 is performed. On the contrary, if not, step 34 is again performed. In step 36, the CPU 14 starts a counter counting the time that no image is formed so as to count time that the laser printer is on without forming an image after completing the image forming operation. When the count is started, the CPU proceeds to step 38. In step 38, the CPU 14 checks whether or not another image forming operation has been started. At this time, if so, step 40 is performed. On the contrary, if not, step 38 is again performed. In step 40, the CPU 14 completes the counting by the counter of the time that no image has been formed. When the count has been completed, the CPU 14 proceeds to step 42. In step 42, the CPU 14 calculates a power saving mode access time. At this time, two methods are used for calculating the power saving mode access time as follows. First, the power saving mode access time is calculated by following equation (1).

$$N=C+r_2\times I \qquad (1)$$

Here, N represents a setup value for the power saving mode access time calculated on the basis of the currently used frequency. C represents a constant indicative of a minimal setup value. The power saving mode access time should not be less than the minimal setting value. $r_2$ represents a weighted value. The weighted value is used for approximately adjusting a weight that such a temporal non-use time that no image is formed provides an estimation of the frequency of use. I represents a count value for the time that no image is formed.

The calculated power saving mode setup value as mentioned above, is generally more than the minimal setting value and is not much influenced by change of such a temporal non-use time in the case of estimating the frequency by the count value corresponding to the time that no image is formed.

Secondly, the power saving mode access time is calculated by following equation <2>.

$$n'=n+r_1\times(n-N) \qquad (2)$$

Here, n' represents a newly calculated power saving mode. n represents an earlier power saving mode setup value stored in a non-volatile memory. $r_1$ represents an weighted value according to a use deviation. N represents the power saving mode setup value calculated on the basis of the currently used frequency and is calculated by the above equation (1). The power saving mode setup value n' calculated by the above equation (2) is calculated as the power saving mode access time setup value N calculated on the basis of the earlier power saving mode setup value n and the currently used frequency. Accordingly, in the second method as mentioned above, the power saving mode access time setup value is gradually is varied according to the frequency used by the user.

When the calculation of the power saving mode access time setup value is executed, the CPU 14 proceeds to step 44. In step 44, the CPU 14 clears the earlier power saving mode setup value in the non-volatile memory and stores the newly calculated power saving mode access time setup value in the non-volatile memory and then proceeds to step 34. Accordingly, the CPU 14 counts each time that no image is formed, thereby resetting the power saving mode access time according to the change of the user's printing tendency or the user by using the time that no image is formed.

The present invention as mentioned in the above has advantages in which the power saving mode access time is automatically reset in response to the time that no image is formed, depending upon the change of the user's printing tendency or the user, so that the user does not need to reset the power saving mode access time according to own image forming tendency. And, the appropriate power saving mode access time is automatically provided, thereby preventing the user from waiting for a wake-up time of the printer or causing an excess power consumption according to the change of the user's printing tendency upon printing.

While there have been illustrated and described what are considered to be preferred embodiments of the present invention, it will be understood by those skilled in the art that various changes and modifications may be made, and equivalents may be substituted for elements thereof without departing from the true scope of the present invention.

What is claimed is:

1. A method of setting a power saving access time of an image forming apparatus, comprising the steps of:

checking a time that no image is formed, and producing a value corresponding to said checked time;

calculating a power saving mode access time according to data corresponding to said checked time; and resetting a power saving mode access time to said calculated power saving mode access time;

said step of calculating said power saving mode access time is effected using the following equation:

access time=minimal setup time+weighted value×value corresponding to time that no image is formed.

2. A method of setting a power saving access time of an image forming apparatus, comprising the steps of:

checking a time that no image is formed, and producing a value corresponding to said checked time;

calculating a power saving mode access time according to data corresponding to said checked time; and resetting a power saving mode access time to said calculated power saving mode access time;

said step of calculating said power saving mode access time is effected using the following equation:

power saving mode access time=currently set power mode access time+first weighted value×{(minimal setup time+second weighted value×value corresponding to time that no image is formed)−currently set power saving mode access time}.

3. The method as claimed in claim 1, said step for checking time that no image is formed comprises the steps of :

starting a count when said image forming operation is completed; and completing said count when a next printing operation is started, so as to produce a count value for said count corresponding to said time that no image is formed.

4. The method as claimed in claim 2, said step for checking time that no image is formed comprises the steps of:

starting a count when said image forming operation is completed; and completing said count when a next printing operation is started, so as to produce a count value for said count corresponding to said time that no image is formed.

5. An apparatus for setting a power saving access time of an image forming apparatus, comprising:

a means for checking a time that no image is formed, and producing a value corresponding to said checked time;

a means for calculating a power saving mode access time according to data corresponding to said checked time; and a means for resetting a power saving mode access time to said calculated power saving mode access time;

said means for calculating said power saving mode access time using the following equation:

access time=minimal setup time+weighted value×value corresponding to time that no image is formed.

6. The apparatus as claimed in claim 5, said means for checking time that no image is formed comprising:

a means for starting a count when said image forming operation is completed; and a means for completing said count when a next printing operation is started, so as to produce a count value for said count corresponding to said time that no image is formed.

7. An apparatus for setting a power saving access time of an image forming apparatus, comprising:

a means for checking a time that no image is formed, and producing a value corresponding to said checked time;

a means for calculating a power saving mode access time according to data corresponding to said checked time; and a means for resetting a power saving mode access time to said calculated power saving mode access time;

said means for calculating said power saving mode access time usings the following equation:

power saving mode access time=currently set power mode access time+first weighted value×{(minimal setup time+second weighted value×value corresponding to time that no image is formed)−currently set power saving mode access time}.

8. The apparatus as claimed in claim 7, said means for checking time that no image is formed comprising:

a means for starting a count when said image forming operation is completed; and a means for completing said count when a next printing operation is started, so as to produce a count value for said count corresponding to said time that no image is formed.

* * * * *